April 18, 1961  J. W. TARBOX  2,980,874
ELECTRIC WINDING
Filed Sept. 16, 1957  3 Sheets-Sheet 1
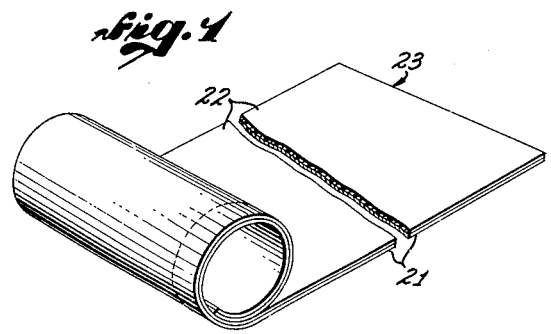
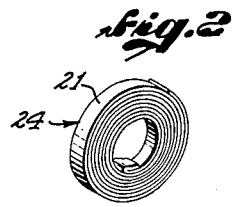
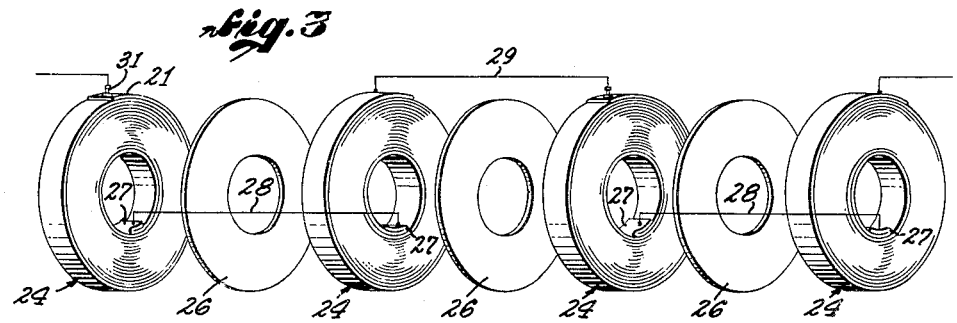
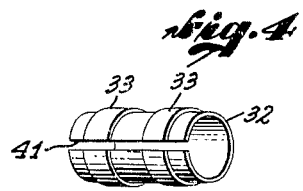
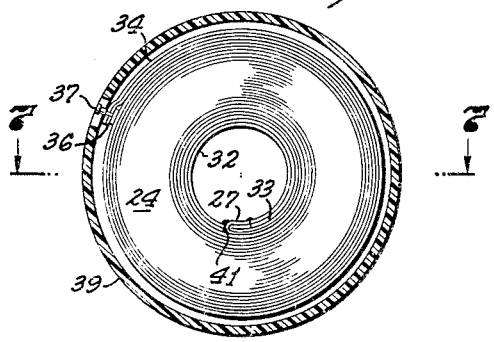
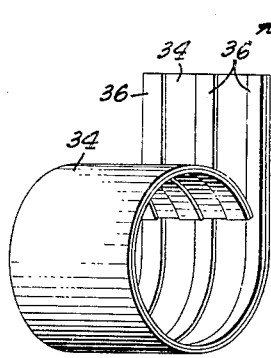
JOHN W. TARBOX,
INVENTOR.
BY HERZIG & JESSUP,
ATTORNEYS.
Warren T. Jessup April 18, 1961   J. W. TARBOX   2,980,874
ELECTRIC WINDING
Filed Sept. 16, 1957   3 Sheets-Sheet 2
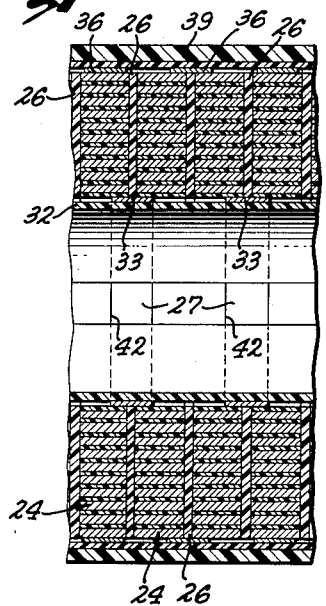
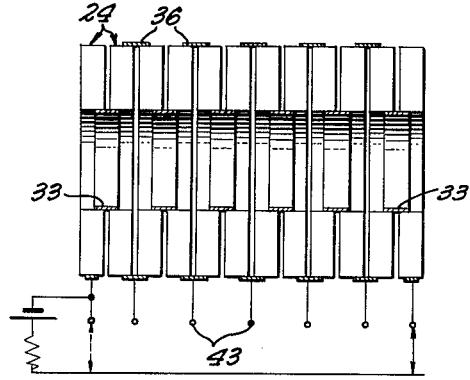
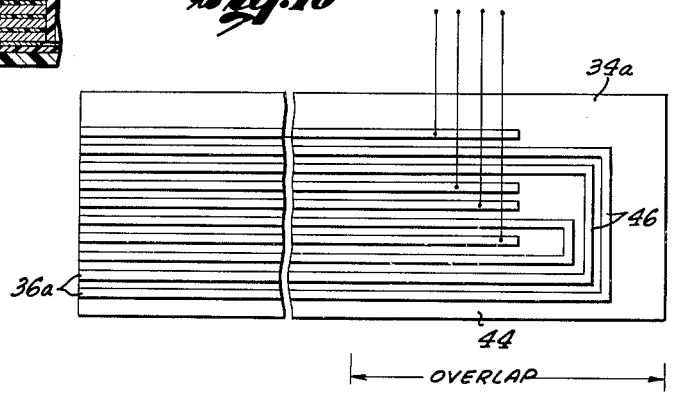
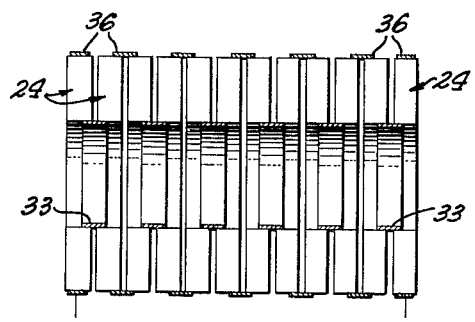
JOHN W. TARBOX,
INVENTOR.
HERZIG & JESSUP,
BY   ATTORNEYS.
Warren T. Jessup April 18, 1961     J. W. TARBOX     2,980,874
ELECTRIC WINDING
Filed Sept. 16, 1957     3 Sheets-Sheet 3
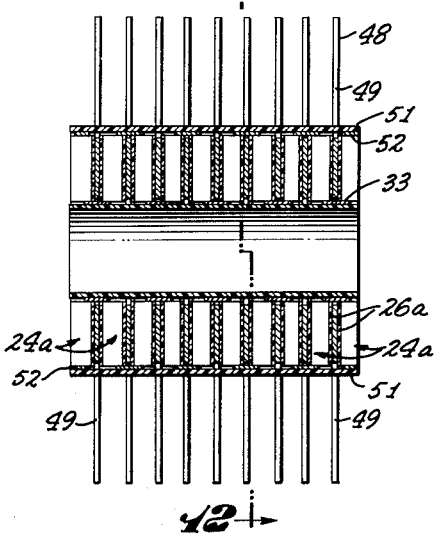
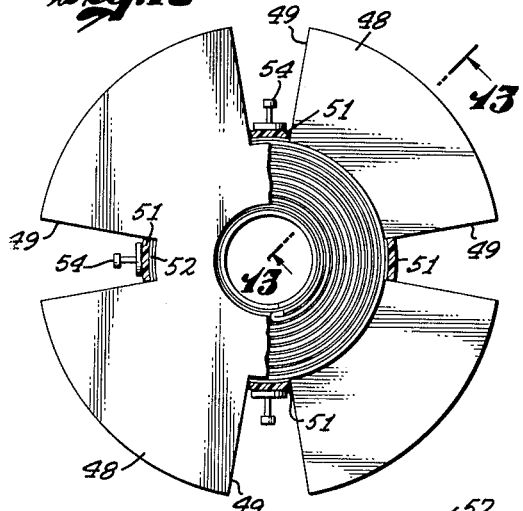
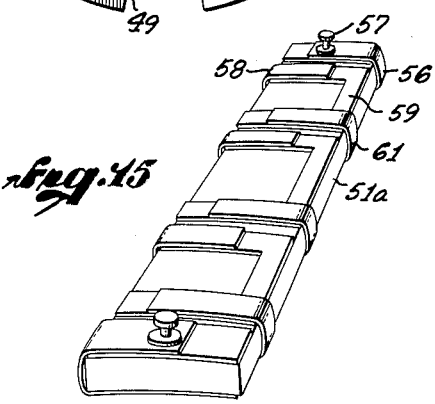
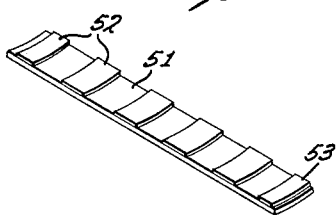
JOHN W. TARBOX,
INVENTOR.
BY    HERZIG & JESSUP,
ATTORNEYS.
Warren T. Jessup

United States Patent Office 2,980,874
Patented Apr. 18, 1961

2,980,874

ELECTRIC WINDING

John W. Tarbox, 6725 Zumirez Drive, Malibu, Calif.

Filed Sept. 16, 1957, Ser. No. 684,191

8 Claims. (Cl. 336—192)

This invention relates to an electric winding and method of making same and has special reference to simplified terminal means for the winding.

It is an object of this invention to provide a simplified terminal means for a flat strip type of electric winding.

It is another object of this invention to provide improved and simplified means for securing terminal connections to a series of flat wound coils.

It is a further object of this invention to provide simplified and improved terminal means through which various permutations and combinations of coil connections may be achieved, thereby to make solenoids, inductors, non-inductive resistors, transformers, and the like.

In accordance with these and other objects which will become apparent hereinafter, preferred forms of the present invention will now be described with reference to the accompanying drawings, wherein:

Fig. 1 is a perspective view showing a sheet of laminated material partially wound to institute winding of a coil;

Fig. 2 is a completed flat strip coil used in the fabrication of an electric winding in accordance with the present invention;

Fig. 3 is an exploded perspective view of a series of coils preparatory to being assembled as an electric solenoid;

Fig. 4 is a perspective view of an insulating sheet type of interconnector constructed in accordance with principles of the present invention;

Fig. 5 is a similar view of an exterior or external connecting sheet;

Fig. 6 is a cross-sectional view of an electric winding constructed in accordance with the present invention showing the application of the interior connecting means or sheet;

Fig. 7 is a cross-section taken on line 7—7 in Fig. 6;

Fig. 8 is a longitudinal section of a series of flat coils, as shown in Fig. 3, connected to form an electromagnet or solenoid;

Fig. 9 is a longitudinal sectional view of a series of coils connected to form a potentiometer, or tapped winding, which may be either non-inductive or inductive;

Fig. 10 is a plan view of a connecting sheet constructed in accordance with the present invention, showing one example of cross or interconnections which make of the device a multiple winding transformer;

Fig. 11 is a longitudinal section of a modified form of device constructed in accordance with the present invention and embodying cooling fins intercalated among the various coils;

Fig. 12 is a cross-section taken on line 12—12 in Fig. 11;

Fig. 13 is a fragmentary section taken on line 13—13 in Fig. 12;

Fig. 14 is a perspective view of an exterior connecting sheet or strip;

Fig. 15 is a perspective view of a modified form of interconnecting strip for creating preselected interconnections such as would be desirable in a multiple winding transformer; and Fig. 16 is a schematic diagram showing the interconnection of windings which would result from three such terminal and interconnecting strips as are shown in Fig. 15 applied to the device of Figs. 11–13.

Referring to the drawings, Fig. 1 shows a laminated sheet of material 23 comprised of a conducting layer 21 suitably bonded to an insulating layer 22. The sheet of material 23 thus formed is wound into a spiral cylinder, and then cut on planes normal to the axis to produce a plurality of spiral coils, each formed of the laminated tape formed from the sheet 23. One such coil is shown at 24 in Fig. 2.

In the example shown in Figs. 1 and 2, the metal or conducting layer 21 has been shown as being wound on the outside, although this is not essential to the practice of the invention, and if desired the tape 24 may be wound with the conducting layer on the inside.

To form a solenoid or electromagnet from a plurality of coils 24, the coils are separated as shown in Fig. 3, and insulating rings or discs 26 are intercalated among the coils 24, said rings 26 preferably being made of a pliant or compressible material for a purpose to be explained hereinafter.

Each coil 24 has an exterior terminal and an interior terminal. When the coils are wound as shown in Figs. 1 and 2, the exterior terminal constitutes the entire outer periphery of the coil. To effect a readily accessible interior terminal, the inner end of the tape is turned back on itself to form a tab 27, thereby exposing a tab of metal of the conducting layer 21. Adjacent pairs of interior terminals 27 are interconnected by interior connecting means shown schematically by the lines 28. Contiguous staggered pairs of coils 24 are likewise connected by exterior connecting means shown schematically by the line 29 in Fig. 3. Where it is desired that the winding or device be an electromagnet or solenoid, every odd coil is turned over so as to wind in the opposite direction from every even coil. Thus, current entering the device at the left-hand exterior terminal 31 flows into the interior of the first coil 24, thence, from its inner terminal 27, across the interconnection 28, and outward in the next adjacent coil 24. Since this coil is reversed, the outward flow of current proceeds in the same rotational direction with respect to the axis of the device, as did the inward flowing current in the first coil 24. Thus, the magnetic flux created by the aggregate of the coils 24 shown in Fig. 3 is all in the same direction, and an electromagnet or solenoid is created.

Where a non-inductive winding is desired, the coils are left in the same position as they occupy when they were originally cut from the sheet 23, and thus when an even number of coils is used, the several magnetic fluxes tend to cancel each other and effect a non-magnetic device.

It will be obvious from the description thus far set forth that the individual coils 24 may be made of individual strips of laminated tape if desired, although it is presently felt that the creation of a large laminated cylinder, as shown in Fig. 1, and the subsequent cutting up to form coils, constitutes an expedient and inexpensive method of manufacture.

In accordance with the present invention, the interconnecting means shown schematically at 28 and 29 in Fig. 3 are formed of insulating sheets arcuately disposed against the coils, and having arcuate conducting strips in physical and electrical contact with given inner terminals 27 or outer terminals 31. In Fig. 4, an inner band or insulating sheet is shown in the form of an arcuate sheet 32, which may be substantially tubular if desired, and on the outer surface of the tube 32 are provided a plurality of arcuate or circumferential conducting strips 33. If desired, the conducting strips 33 may be printed on to the sheet 32 before the latter is rolled into the tubular form shown in Fig. 4.

In practicing the invention, the band or tube 32, shown in Fig. 4, is placed inside of a stack of coils, as shown in Fig. 3, and so disposed that a given conducting strip 33 contacts a pair of adjacent terminal tabs 27, thereby electrically bridging these tabs and constituting the interconnection shown schematically at 28 in Fig. 3.

An outer connecting sheet or band is shown in Fig. 5, consisting of an insulating strip or sheet 34, carrying on its interior surface a plurality of parallel conducting strips 36. The inner of these conducting strips contacts and bridges the outer terminals of the inner pair of coils 24, and thus constitutes the inner connection shown schematically at 29 in Fig. 3. The two outer strips 36 contact the exterior terminal portions 31 of the two end coils 24, shown in Fig. 3, and thus constitute the two terminals of the device to which suitable external connection may be made. Such an external connection is shown in the form of a terminal member 37, secured to one of the end strips 36, and extending through the insulating sheet or backing 34 and thence through an aperture 38 in a housing 39, which surrounds the complete winding.

The inner band 32 is preferably formed of a somewhat stiff insulating material and is wound into the tubular form shown in Fig. 4, leaving a narrow longitudinal slot 41. This permits the band 32 to be ensmalled slightly for easier insertion inside the coils 24, the inherent resiliency of the band 32 then serving to press it outward so that the conducting strips 33 are pressed into firm engagement with the terminal tabs 27. To this end, the turned back inner end of the tape 24 is made of sufficient length so that it will easily bridge the gap 41 in case the gap should coincide with the tab 27.

To further physically and electrically secure the strips 33 to the tabs 27, solder is flowed into and across the conducting faces. If the construction is such that the slot 41 coincides with a tab 27, the slot forms the passageway by means of which the solder and the heating iron may find communication to the contacting surfaces from the interior of the coil. An alternative method is to provide a series of shorter slots 42 (Fig. 7) which, in the assembly of the interior connecting sheet 32, are arranged to coincide and overlie the adjacent tabs 27. To simplify this procedure, it is preferred to tin the surfaces of the tabs 27 and the strips 33, thereby rendering them more adaptable to accepting the solder bond.

In Fig. 8 there is shown somewhat schematically an interior and exterior connecting sheet or strip arrangement which results in a solenoid. It is to be understood in this regard that alternate coils 24 are reversed, so that the total passage of the current from one end of the device to the other will always be in the same direction of rotation, whereby the magnetic fields are cumulative.

In Fig. 9 a terminal arrangement is shown for making a tapped winding. If the winding is to be inductive, alternate coils are reversed, as in the solenoid of Fig. 8. If the winding is to be non-inductive, alternate coils are not reversed, so that the alternate magnetic fields cancel each other. In either event, each exterior terminal 31 is brought to the outside of the housing of the device and there made accessible through suitable connecting terminal means shown schematically at 43. The terminals 43 could constitute the intermediate contacting points of a discrete variable potentiometer, which, in the more usual case, would be arranged to be non-inductive.

The design of the present invention lends itself most readily to easy, simplified, and inexpensive assembly methods. For example, and referring to Fig. 3, it is preferred to coat each side of each insulating ring or disc 26 with a suitable adhesive which may be either of the pressure type or some other type, such as a time setting type, i.e., an adhesive which solidifies and bonds after a period of time because of the presence of a solidifying or setting agent. In assembling such a winding, as shown in Fig. 3, the first coil 24 is placed on a suitable jig and an adhesive carrying ring 26 is laid thereover; the next coil 24 is then applied to the stack and pressed downward against the ring and coil. The process is thus continued with alternate layers of insulation and coil until the desired number of coils as required by the design have been laid on.

After the desired number of coils have been thus stacked together, the entire winding or device may be axially compressed by virtue of the compressibility of the discs or rings 26. This compression may be continued until a predetermined axial length of the device has been attained. Thus, the compressibility of the discs forms a ready means for overcoming and compensating for tolerance buildup in the widths of the several coils 24. At the same time, the compression of the device serves to further enhance the bond between coils 24 and rings 26, particularly when a pressure sensitive adhesive is used on the rings.

The present invention is especially and uniquely suited to the simple and economic provision of any desired manner of interconnections among the several coils 24. Such interconnections would be required, for example, in the case of a multiple winding transformer, and a suitable interconnecting sheet is shown in Fig. 10. This sheet 34a has on one face thereof a plurality of parallel conducting strips 36a. This face becomes the interior face of the interconnecting sheet when it is arcuately wound around the outside of a series of stacked coils 24. When wound around a stack of coils, the axis of the coils is vertical with respect to the sheet shown in Fig. 10 so that the strips 36a are circumferentially laid into electrical and physical contact with respective individual tape terminals 31 of the several coils 24. In the sheet 34a, each of the strips 36a is of substantially the same width as a given terminal strip 31 and contacts only a single terminal strip. The sheet 34a is made long enough so that it wraps completely around the coils 24, and the end of the strip 34a overlaps, so that the right hand portions of the strips 36a now lie adjacent the back of the insulation 34a. In this overlapped portion 44 there is provided a plurality of transverse or cross-conducting strips 46 which in assembled position are longitudinal with respect to the finished winding. The interconnections thus made by the longitudinal strips 46 running between selected pairs of circumferential strips 36a serve to create, in the specific instance shown in Fig. 10, a device such as a transformer having three separate windings, which by virtue of the close stacking of the coils 24, are closely magnetically linked as transformer windings should be. These three windings are brought out to three pairs of terminals shown at 47 by any suitable means such as the terminals 37 shown in Fig. 6.

As in the case of the interior arcuate conducting sheet shown in Fig. 4, electrical and physical bonding between the terminals 31 and the circumferential connecting strips 36 or 36a is preferably enhanced by soldering the contacting strips together at least at certain portions of the contact. To this end, the sheet 34 or 34a may be suitably slotted in the manner illustrated at 42 in connection with Fig. 7. The completed device is preferably encased within a housing corresponding to the housing 39 of Fig. 6.

The present design lends itself most elegantly to the incorporation of cooling fins, shown in Figs. 11–13, wherein the fins are in the form of thin metallic heat-conducting discs 48 intercalated between a pair of insulating rings 26a, which serve to separate adjacent coils 24a. Since the fins 48 extend radially outward well beyond the circumferential terminals 31, radial slots 49 are provided in the disc fins 48, whereby access is given to one or more interconnecting strips 51 (Fig. 14) made of insulating material and having bridging metallic surfaces or strips 52 which serve to interconnect adjacent exterior terminals 31, and in the case of the end terminals or interconnections 53, serve as a means of access for exterior connections 54.

The disc form of device shown in Fig. 12 is also adaptable for multiple winding combinations, by the provision of special interconnecting strips such as the one shown in Fig. 15. In Fig. 15, the strip 51a made of insulating material has selectively wound therearound certain short conducting strips which provide the interconnections shown schematically in Fig. 16. In the specific example shown in Figs. 15 and 16, an end strip 56 encircles the elongate insulating member 51a, and at its under surface (Fig. 15) contacts the exterior terminal 31 of the end coil 24 in the stack of coils. Encircling the insulator 51a, the strip 56 terminates in a suitable external connecting terminal 57. Adjacent to the strip 56, but electrically insulated therefrom, is a short strip 58 which serves to bring the connection from the next adjacent terminal 31 to the upper or outer surface of the insulator 51a. At this point connection is made to a U-shaped bridging connector 59, which carries the connection past the next four coils and over to the seventh coil in the stack, where it is taken to the under or inside of the strip 51a by a conducting strip 61. Interconnections are thus made along the length of the strip 51a, and in this manner the winding denominated 1 in Fig. 16 is created. Windings 2 and 3 are similarly interconnected by suitable conducting strips laid on and around another and different insulator 51a, which resides in another of the radial slots 49. Thus, for the winding shown in Fig. 16, three individually spaced and arranged interconnecting strips 51a are required, laid in three of the four radial slots 49. In the fourth slot a dummy strip may be applied to give physical symmetry to the assembly.

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims.

What is claimed is:

1. An electric winding, comprising in combination a plurality of axially aligned spiral coils each having an interior terminal and an exterior terminal, and connecting means for interconnecting given terminals of said coils, in the form of an insulating sheet arcuately disposed continguous to said coils and having a plurality of conducting strips thereon in physical and electrical contact with said given terminals of said coils.

2. Winding in accordance with claim 1, including a plurality of flat insulating rings coaxially intercalated among said coils and made of compressible material to accommodate for tolerance build up in width of said coils.

3. An electric winding, comprising in combination a plurality of axially aligned spiral coils each having an interior terminal and an exterior terminal, and interior connecting means for interconnecting given interior terminals of said coils, in the form of an insulating sheet arcuately disposed within said coils and having a plurality of conducting strips thereon in physical and electrical contact with said given interior terminals.

4. An electric winding, comprising in combination a plurality of axially aligned spiral coils each having an interior terminal and an exterior terminal, interior connecting means for interconnecting given interior terminals of said coils, in the form of an insulating sheet having a plurality of transverse conducting strips thereon, each said conducting strip being in physical and electrical contact with a respective pair of adjacent interior terminals, and means for interconnecting adjacent pairs of external terminals.

5. Device in accordance with claim 4, wherein said insulating sheet is in the form of a tube disposed substantially coaxially with respect to said coils and said transverse strips are in the form of circumferential external conducting bands disposed at least partially around said tube.

6. Device in accordance with claim 4, wherein said external connector comprises a sheet of insulating material at least partially wound around said aligned coils and extending substantially the axial length of said coils, said sheet having on the interior surface thereof a plurality of circumferential strips of conducting material, each conducting strip being in physical and electrical contact with a respective pair of external terminals of said coils.

7. Device in accordance with claim 6, wherein said insulating sheet has a plurality of longitudinal strips at one end thereof interconnecting certain of said circumferential strips.

8. Wound electrical device comprising a plurality of aligned spiral coils, a plurality of heat-conducting fins intercalated among said coils and extending radially outward beyond the exterior of said coils, at least one notch extending radially inward at least as far as the exterior of said coils, each of said notches in said fins being longitudinally aligned to form a channel, and a strip of insulating material disposed in said channel and having on its inner face a plurality of transverse conductors, each of said conductors being in physical and electrical contact with a respective pair of outer terminals, thereby to interconnect said respective pair of outer terminals.

References Cited in the file of this patent

UNITED STATES PATENTS

| | | |
|---|---|---|
| 734,778 | Varley | July 28, 1903 |
| 2,628,996 | Mayo | Feb. 17, 1953 |